United States Patent [19]

Velkoff

[11] 3,749,545
[45] July 31, 1973

[54] APPARATUS AND METHOD FOR CONTROLLING LIQUID FUEL SPRAYS FOR COMBUSTION

[75] Inventor: Henry R. Velkoff, Worthington, Ohio

[73] Assignee: The Ohio State University, Columbus, Ohio

[22] Filed: Nov. 24, 1971

[21] Appl. No.: 201,794

[52] U.S. Cl............. 431/2, 431/8, 123/119 E
[51] Int. Cl............................. F23b 7/00
[58] Field of Search............ 431/2, 8; 123/119 E; 261/DIG. 48, 1; 239/15

[56] References Cited
UNITED STATES PATENTS
1,854,475  4/1932  Littlefield.................. 123/119 E
1,771,626  7/1930  Hamilton................... 123/119 E FOREIGN PATENTS OR APPLICATIONS
1,302,407  7/1962  France........................... 431/2
1,013,015  12/1965  Great Britain................. 431/2

*Primary Examiner*—Meyer Perlin
*Assistant Examiner*—William C. Anderson
*Attorney*—Christopher B. Fagan, Anthony D. Cennamo and Sidney W. Millard

[57] ABSTRACT

A method and apparatus for increasing the efficiency of combustion by controlling liquid fuel sprays characterized by electrostatically influencing the size distribution and trajectory of liquid fuel droplets introduced into the combustion chamber. The liquid fuel spray, the walls of the combustion chamber and any ducting associated therewith are electrostatically charged by appropriately positioned electrodes to influence a fuel droplet-air contact which tends to maximize combustion efficiency and hence reduce air pollution.

5 Claims, 2 Drawing Figures

Patented July 31, 1973  3,749,545

INVENTOR.
HENRY R. VELKOFF
BY
Cennamo Kremblas & Foster
ATTORNEYS

APPARATUS AND METHOD FOR CONTROLLING LIQUID FUEL SPRAYS FOR COMBUSTION

BACKGROUND

Many attempts have been made to improve efficiency of fuel combustion and to reduce the air pollution caused by incomplete combustion of the fuel used. Various methods and means have been previously employed with varying levels of success being achieved. However, none of these prior art approaches have met with such success that the problem of combustion and the air pollution caused thereby have been considered as satisfactorily solved.

The present invention approaches this problem by providing means to achieve a substantial increase in the efficiency of combustion and thereby substantially reduce air pollution resulting from less efficient fuel combustion. Prior efforts in the area of burning liquid fuels have attempted to obtain better mixing of the fuel-air mixture by various mechanical or physical means and designs of combustion chambers which tend to promote better fuel to air contact. However, each of these inherently suffer certain heretofore unsolved difficulties resulting from the largely uncontrolled size of the liquid fuel droplets emitted from the fuel spray nozzles and the like and the relatively uncontrolled trajectories of the droplets leaving the inlet nozzles. Some droplets burn inefficiently because of their size or because of poor distribution in the air stream with which they are mixed. Further, some of the droplets invariably impinge upon the relatively cold walls of the combustion chamber or passages leading thereto and poor combustion results in increased carbon deposits and smoke formation.

While some effort has been recently conducted in this country relative to the effect of electrostatic fields on liquid droplets, this work primarily has been done with respect to colloid electrical propulsion of space vehicles. Other efforts have been related to directing the path of ionized combustion products by the influence of electrostatic fields.

SUMMARY OF THE INVENTION

The present invention relates to the method and apparatus for increasing the efficiency of combustion by electrostatically influencing the size distribution and trajectory of liquid fuel droplets introduced into a combustion chamber.

The liquid fuel spray is electrostatically charged by the application of relatively high voltages and suitable shaped electrodes. The size of the droplets can be controlled by both the physical aspects of the spray nozzle and the amount of charge applied to the droplets. Suitably disposed electrodes and predetermined applied voltages are then used downstream of the inlet nozzle to control the path of the charged droplets to and in the combustion zone. Further, it is preferred that the walls of the chamber and the ducting leading to the chamber are charged relative to the fuel droplets to repel the droplets away from their walls which tend to move them toward the central zone in the combustion chamber for more efficient combustion. This promotes increased efficiency with a resulting reduction in air pollution.

OBJECTS OF THE INVENTION

It is a primary object of the present invention to provide a method and apparatus for controlling liquid fuel sprays to maximize combustion efficiency and thereby reduce air pollution.

It is another object of the present invention to provide a method and apparatus of the type described which employs electrostatically charged liquid fuel droplets and oppositely charged combustion chamber walls to promote uniform size distribution among the fuel droplets and influence the path of these droplets to promote more efficient fuel consumption.

Further objects and advantages of the present invention will be apparent from the following description, reference being had to the accompanying drawings wherein a preferred form of embodiment of the invention is clearly shown.

DESCRIPTION OF THE PREFERRED EMBODIMENTS

Figure 1:
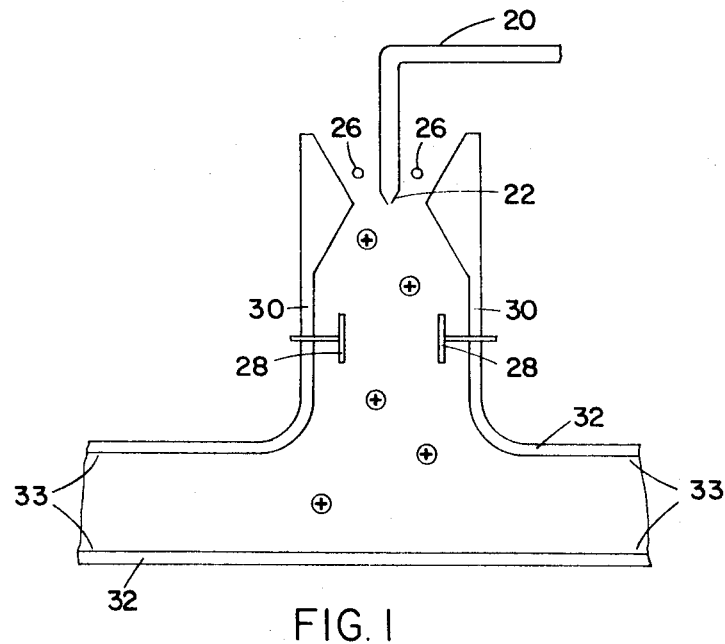
FIG. 1 is a side sectional view diagrammatically illustrated of a portion of a carburetor for an internal combustion engine constructed in accordance with the present invention.

Referring specifically to FIG. 1, a portion of a carburetion system for an internal combustion engine is diagrammatically illustrated and constructed in accordance with the present invention. A conventional fuel line 20 communicates with the inlet nozzle 22 which is disposed adjacent to the venturi 24 of the carburetor.

A relatively high voltage is applied to the nozzle 22, by any conventional means not shown, and nozzle 22 is electrically insulated from the remaining structures of the carburetor. In most applications, this voltage could range from approximately 1,000 to as high as 20,000 volts depending upon the individual design circumstances of each particular application.

An opposite charge relative to the charge applied to nozzle 22 having a relatively low voltage value is then applied to field shaping electrodes 26 which creates a high electrostatic field surrounding the outlet of nozzle 22. The fuel droplets leaving nozzle 22 must then pass through this field and are consequently charged.

The amount of charge on each droplet is dependent upon the amount of the applied voltage and the conductivity of the droplets.

The droplet size using the method and apparatus of the present invention depends upon the physical characteristics of the inlet fuel nozzle, the characteristics of the air stream introduced to mix with the fuel and the charge of the droplet. Since the fuel nozzle's characteristics, the air stream velocity, and the conductivity and surface tension of the droplet can be predetermined and controlled to remain substantially constant, the droplet size and size distribution can be closely controlled by the amount of the applied electrostatic field.

Therefore according to the present invention, the applied electrostatic field can be chosen to provide the creation of the optimum size droplets which provide optimum combustion efficiency. Generally, this entails maintaining the droplet size at the minimum possible for a given set of individual conditions to create greater surface area for contact with the air for more efficient fuel evaporation and to obtain a more even size distribution to effect more desirable conditions for obtaining the optimum fuel-air mixture.

As the charged fuel droplets begin to mix with the air stream, the charged droplets tend to be dispersed due to the repulsion of like charges and therefore coalescence into larger droplets is minimized. This also tends to obtain greater overall evaporation of the fuel droplets and therefore promotes better mixing with the air stream since unsaturated air may more readily come into contact with the greater surface area of the small evenly dispersed fuel droplets.

The initial trajectory of the fuel droplets can also be controlled by the disposition and shape of the field shaping electrodes 26. In the embodiment shown, electrodes 26 are relatively elongated and cylindrically shaped, however, a ring-shaped or a series of concentric ring-shaped electrodes may be used, for example, to create a specific initial pattern of the spray of charged droplets.

Further, other means can be used to create an electrostatic field to charge the fuel spray, for example, a corona point discharge to create in effect a cloud of positive ions adjacent the outlet of nozzle 22 through which the spray of droplets must pass. The physical location and shape of such an arrangement can be varied according to the initial effect desired to control and influence the trajectory of the spray.

In the most simple form, a pair of path influencing electrodes 28 are shown downstream of nozzle 22 and are appropriately charged to influence the direction of the charged droplets leaving nozzle 22. It should, however, be pointed out that in any specific application, the design characteristics of a system employing the teaching of the present invention could include a series of such influencing electrodes to more closely control the path of the charged droplets as desired. The important point is that the charged droplets be influenced to travel in a manner which promotes more efficient evaporation for a more even mixture with the accompanying air stream to effect more complete combustion.

It is also preferred that the walls of the duct or passage 30 and the walls of manifold 32 be charged with the same polarity as the charged fuel droplets. This tends to repel the charged droplets away from the walls of the ducts and manifold to minimize the collection of wet fuel droplets on the walls of the passages. Without control, the fuel typically can wet the sides of the carburetor passages and the manifold with a resulting uneven or poor mixing effect between the fuel and air stream.

At the end of the manifold 32, suitable electrodes 33, can be placed to collect the free charge after vaporization is complete. It is possible that under favorable design conditions, such electrodes could be placed within the combustion chamber itself.

In this manner the use of electrostatic fields to influence the spray of fuel droplets passing through the carburetor of an internal combustion engine provides better control of the fuel-air mixture to approach optimum conditions for complete combustion and therefore a reduction of potential air pollution. It should be understood that the polarity of nozzle 22 and the various electrodes could be reversed if desired, and still achieve the desired results.

Figure 2:
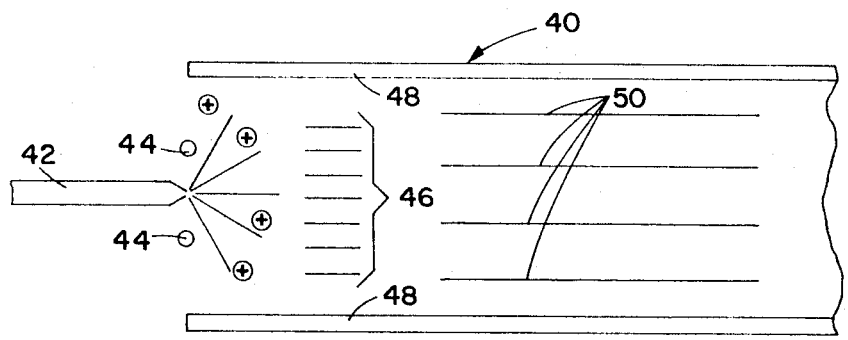
FIG. 2 is a diagrammatic view of simple combustion chamber and fuel inlet constructed in accordance with the present invention illustrating another preferred embodiment thereof.

Now referring to FIG. 2, a modified embodiment is shown wherein the principles of the present invention are applied to combustion chambers of industrial or home heaters or the like which employ a liquid fuel injection system.

A schematic representation of a portion of a combustion chamber for an air heater is indicated generally at 40 and includes a fuel inlet nozzle 42 which in turn is conventionally connected to a source of liquid fuel such as oil, not shown.

Similar to the embodiment shown in FIG. 1, a high positive voltage is applied to the fuel nozzle 42 and a negative voltage of relatively low value is applied to field shaping electrodes 44 disposed in adjacent relationship to the outlet of nozzle 42. Therefore the fuel droplets leaving nozzle 42 carry a positive charge which is induced by the potential difference between nozzle 42 and electrodes 44. Again it should be noted that the respective polarities may be reversed if desired.

The physical characteristics of the spray nozzle and the amount of charge on the fuel droplets again are used to control the droplet size and size distribution as in the first described embodiment to create a fine spray of droplets of even size distribution.

The spray of charged droplets mix with the entering air stream adjacent to nozzle 42 and the trajectory is influenced by a series of electrodes 46 downstream of nozzle 42. As shown, in FIG. 2, trajectory influencing electrodes 46 comprises a series of plates evenly spaced from one another and disposed in a more or less concentrated manner in the central zone of chamber 40 away from the chamber walls 48. Appropriately charged, electrodes 46 tend to attract the charged fuel droplets toward the central zone of the chamber 40 and the walls 48 of chamber 40 are charged with the same polarity as the droplets to repel the droplets. Further, the heat exchanger walls 50 are also charged to repel droplets. This substantially minimizes the impingement of fuel droplets on the surface of walls 48 and the heat exchanger walls 50 and therefore substantially reduces wetting of these surfaces by unburned fuel droplets which results in poor uneven burning of the fuel. Accordingly carbon deposits on these respective surfaces are greatly reduced and a reduction of smoke formation is achieved.

Also, it should be pointed out that the charged droplets are more evenly dispersed in the air stream because of the repulsion of the like charges each droplet carries which in conjunction with the controlled droplet size and distribution results in more even mixing with the air stream. Similar to the description of the embodiment shown in FIG. 1, the control of size distribution and particle size, in conjunction with the control of trajectory and reduction of coalescence between droplets, results in more efficient combustion of the fuel and an accompanying reduction in air pollution.

What is claimed is:

1. A method for controlling the size distribution and the path of liquid fuel sprays entering a combustion chamber comprising, in combination, the steps of applying a predetermined potential between the inlet fuel nozzle and electrode means disposed adjacent to but spaced from the outlet of said nozzle to charge the fuel droplets leaving said nozzle; directing the path of the charged fuel droplets leaving the nozzle and entering a combustion chamber to mix with an air stream by dispersing said droplets with electrodes disposed in a predetermined location along the desired path of the droplets and the air stream; applying an opposing charge relative to the charge applied to said fuel droplets to the walls of the ducting along the path communicating with the combustion chamber to repel the droplets away from said walls and move them toward the central zone of the ducting; and firing the fuel-air mixture in said chamber at a downstream position relative to the position of said electrodes.

2. The method defined in claim 1 including the step of collecting the free electrostatic charge remaining after the fuel droplets have vaporized.

3. In a combustion system employing liquid fuel the combination of a fuel injection nozzle communicating with a source of liquid fuel and with a combustion chamber; means for applying a high voltage to said nozzle; field-shaping electrode means disposed adjacent to but spaced from the outlet of said nozzle carrying a voltage of opposite polarity to and of a lower value than the voltage applied to said nozzle; means for introducing an air stream to mix with the charged fuel droplets leaving said nozzle; path influencing electrodes disposed downstream of said nozzle to influence the trajectory of the fuel droplets carried in said air stream; means for charging the walls of asid combustion chamber with a charge of like polarity to the charge carried by said fuel droplets; and means for firing said fuel-air mixture disposed downstream of said path influencing electrodes.

4. The system defined in claim 3 including electrode means disposed downstream of said nozzle to collect the free electrostatic charge remaining after vaporization of the charged liquid fuel droplets has occurred.

5. The system defined in claim 4 including collecting electrode means disposed downstream of said path influencing electrodes to collect the free electrostatic charge remaining after vaporization of the charged fuel droplets has occurred.

* * * * *